United States Patent [19]

Anderson

[11] 4,094,858

[45] *June 13, 1978

[54] FLAME RETARDANT PLASTIC COMPOSITIONS

[75] Inventor: Arnold L. Anderson, Antioch, Ill.

[73] Assignee: Velsicol Chemical Corporation, Chicago, Ill.

[*] Notice: The portion of the term of this patent subsequent to Sep. 20, 1994, has been disclaimed.

[21] Appl. No.: 818,373

[22] Filed: July 25, 1977

Related U.S. Application Data

[63] Continuation-in-part of Ser. No. 330,806, Feb. 8, 1973, Pat. No. 4,049,624.

[51] Int. Cl.$^2$ .............................. C08K 5/06
[52] U.S. Cl. .............. 260/45.75 B; 260/45.75 D; 260/45.75 W; 260/45.95 G
[58] Field of Search .............. 260/45.75 B, 45.75 W, 260/45.95 G, 45.75 D

[56] References Cited

U.S. PATENT DOCUMENTS

| | | | |
|---|---|---|---|
| 3,971,759 | 7/1976 | Anderson | 260/45.75 B |
| 4,032,507 | 6/1977 | Anderson | 260/45.95 G |
| 4,032,508 | 6/1977 | Anderson | 260/45.95 G |
| 4,049,624 | 9/1977 | Anderson | 260/45.75 W |

*Primary Examiner*—V. P. Hoke
*Attorney, Agent, or Firm*—Robert M. Phipps

[57] ABSTRACT

Plastic compositions containing polystyrenes, an enhancing agent, hereinafter defined in the specification, and bis-phenoxy compounds having the formula

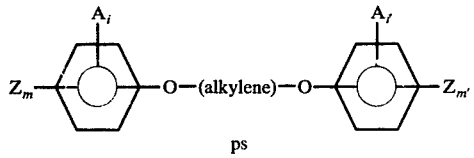

wherein Z is bromine, m is an integer having a value of 1–5 and m' is an integer having a value of 0–4, i is an integer having a value of 0–2 and i' is an integer having a value of 1–5, alkylene is a straight or branched chain alkylene group having from 1 to 6 carbon atoms and A is chlorine.

16 Claims, No Drawings

FLAME RETARDANT PLASTIC COMPOSITIONS

RELATED PATENT APPLICATIONS

This application is a continuation-in-part of a copending application, Ser. No. 330,806, filed Feb. 8, 1973, now U.S. Pat. No. 4,049,624.

PRIOR ART

The prior art considered in conjunction with the preparation of this application is as follows: U.S. Pat. Nos. 1,979,145; 2,130,990; 2,186,367; 2,263,444; 2,329,033; 2,488,499; 2,738,351; 2,797,246; 2,930,815; 3,384,819; 3,403,036; 3,549,591; 3,560,441; 3,649,591; 3,658,634; 3,666,692; 3,686,320; 3,697,456; 3,717,609; 3,763,243; 3,787,506; German Pat. No. 891,549; German Pat. No. 1,139,636; German Pat. No. 2,054,522; Japanese Pat. No. (72) 14,500 (and as cited in Volume 77, Chemical Abstracts, column 153737k, 1972); Chemical Abstracts, Volume 13, column 4485; Chemical Abstracts, Volume 31, column 70459; Chemical Abstracts, Volume 52 (1958), column 4543–4544; Journal of the Chemical Society, pages 2972–2976 (1963); Journal of the American Chemical Society, Volume 57 (1935), pages 572–574 and Volume 76 (1954), page 2993; Journal of the Science of Food and Agriculture, Volume 20 (1969), pages 748–754; Philippine Journal of Science, Volume 34 (1927), page 159; and Japanese Patent publication 033,456 of 1974. All of these publications are to be considered as incorporated herein by reference.

The present invention relates to plastic ompositions containing polystyrenes. More specifically, the present invention covers plastic compositions containing polystyrenes and certain bis-phenoxy compounds (hereinafter defined) as flame retardants for said plastic compositions and certain enhancing agents for said bis-phenoxy compounds/flame retardants.

Polystyrenes and utility thereof are known in the art as exemplified by *Polystyrene*, W. C. Teach and G. C. Kiessling (Reinhold Plastics Applications Series), Reinhold Publishing Corporation, New York, 1960 and *Modern Plastics Encyclopedia* 1972–1973, Vo. 49: No. 10A, October, 1972, pages 97–99, 161 and 271–272 and which publications are in toto incorporated herein by reference.

The need for flame retarding polystyrenes has also been recognized in the art as exemplified by U.S. Pat. Nos. 3,347,822 and 3,422,048 and Modern Plastics Encyclopedia, ibid, pages 221, 222 and 456–458 and which publications are in toto incorated herein by reference.

The resultant disadvantages in the utilization of various prior art materials as flame retardants for polystyrenes include, without limitation, factors such as thermal migration, heat instability, light instability, non-biodegradable, toxicity, discloration and the large amounts employed in order to be effective. Thus, there is always a demand for a material which will function as a flame retardant in polystyrenes and concurrently will not, by incorporation therein, adversely effect the chemical and/or physical and/or mechanical properties of the resultant polystyrene plastic composition.

The prior art problem of providing a flame retarded polystyrene composition having desired chemical, physical and mechanical properties has now been substantially solved by the present invention and the above-described disadvantages substantially overcome.

Accordingly, one of the main objects of the present invention is to provide polystyrene plastic compositions which are flame retarded.

Another object of the present invention is to provide a material for polystyrene plastic compositions which will not substantially adversely effect the chemical and/or physical and/or mechanical properties of said compositions.

A further object of the present invention is to provide a flame retardant which is economic and easy to incorporate into polystyrene plastics without being degraded or decomposed as a result of blending or processing operations.

It has been found that the foregoing objects can be obtained by the incorporation of a new class of bis-phenoxy compounds in polystyrenes to subsequently provide flame retarded compositions which exhibit outstanding chemical, physical and mechanical properties.

The bis-phenoxy compounds used in the present invention compositions have the formula:

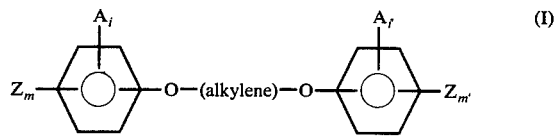

(I)

In Formula I above, Z is bromine; $m$ is an integer having a value of 1–5 and $m'$ is an integer having a value of 0–4; $i$ is an integer having a value of 0–2 and $i'$ is an integer having a value of 1–5; alkylene is a straight or branched chain alkylene group having from 1 to 6 carbon atoms (e.g. $CH_2$, $C_2H_4$, $C_3H_6$, $C_4H_8$, $C_5H_{10}$, $C_6H_{12}$ and $CH_2CH(CH_3)CH_2$; and A is chlorine.

It is to be understood that all of the compounds falling within the above Formula I and as heretofore defined are generically described herein as "bis-phenoxy" compounds.

The bis-phenoxy compounds are found to be compatible with and effective additives for various polymeric systems to make the resultant polymer fire retardant.

Illustrative (but without limitation) of some of the present invention bis-phenoxy compounds are shown below:

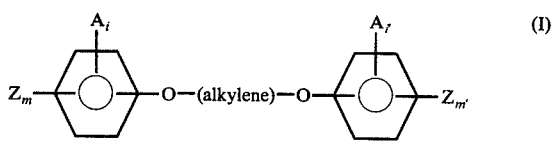

(I)

the exemplary definitions of A, Z, $i$, $i'$, $m$, $m'$ and alkylene are listed in Table I.

Table I

| Compound No. | Z | m | m' | A | i | i' | Alkylene |
|---|---|---|---|---|---|---|---|
| 1 | Br | 2 | 2 | Cl | 1 | 1 | $CH_2$ |
| 2 | Br | 2 | 2 | Cl | 1 | 1 | $C_2H_4$ |
| 3 | Br | 2 | 2 | Cl | 1 | 1 | $C_3H_6$ |
| 4 | Br | 3 | 0 | Cl | 0 | 5 | $C_2H_4$ |
| 5 | Br | 3 | 0 | Cl | 0 | 5 | $C_3H_6$ |
| 6 | Br | 3 | 0 | Cl | 0 | 5 | $C_4H_8$ |
| 7 | Br | 3 | 3 | Cl | 1 | 1 | $C_4H_8$ |
| 8 | Br | 2 | 2 | Cl | 2 | 2 | $C_3H_6$ |
| 9 | Br | 2 | 2 | Cl | 2 | 2 | $C_4H_8$ |
| 10 | Br | 5 | 0 | Cl | 0 | 5 | $C_2H_4$ |
| 11 | Br | 5 | 0 | Cl | 0 | 5 | $C_4H_8$ |
| 12 | Br | 2 | 2 | Cl | 1 | 1 | $C_6H_{12}$ |
| 13 | Br | 3 | 0 | Cl | 0 | 5 | $C_6H_{12}$ |
| 14 | Br | 4 | 1 | Cl | 1 | 4 | $C_2H_4$ |

Table I-continued

| Compound No. | Z | m | m' | A | i | i' | Alkylene |
|---|---|---|---|---|---|---|---|
| 15 | Br | 3 | 3 | Cl | 1 | 1 | $C_3H_6$ |
| 16 | Br | 3 | 3 | Cl | 1 | 1 | $C_6H_{12}$ |
| 17 | Br | 2 | 2 | Cl | 2 | 2 | $C_2H_4$ |
| 18 | Br | 4 | 4 | Cl | 1 | 1 | $C_3H_6$ |
| 19 | Br | 3 | 3 | Cl | 1 | 1 | $C_2H_4$ |
| 20 | Br | 3 | 3 | Cl | 2 | 2 | $C_3H_6$ |
| 21 | Br | 2 | 2 | Cl | 1 | 1 | $CH(CH_3)CH_2$ |
| 22 | Br | 4 | 4 | Cl | 1 | 1 | $CH(CH_3)CH_2CH_2$ |
| 23 | Br | 3 | 3 | Cl | 2 | 2 | $CH_2CH(CH_3)CH_2CH_2$ |
| 24 | Br | 1 | 1 | Cl | 1 | 1 | $CH_2$ |
| 25 | Br | 1 | 1 | Cl | 1 | 1 | $C_2H_4$ |

In general, the bis-phenoxy compounds are prepared by reacting a halogenated phenol with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g. acetone, methyl ethyl ketone, and methyl iso-butyl ketone), alcohols (e.g. methanol, ethanol, iso-propyl alcohol, butyl alcohol and glycols), or aqueous solvents (e.g. water, a mixture of water and alcohol and a mixture of water and ketone) can be employed. The desired end product, i.e. the bis-phenoxy compound, can be recovered from the reaction mass via various methods such as distillation or crystallization. Where the end product requires recovery via crystallization, various aromatic solvents such as benzene, toluene, xylene, dichlorobenzene and the like can be used.

Specifically, the bis-phenoxy compounds are prepared according to the following reactions:

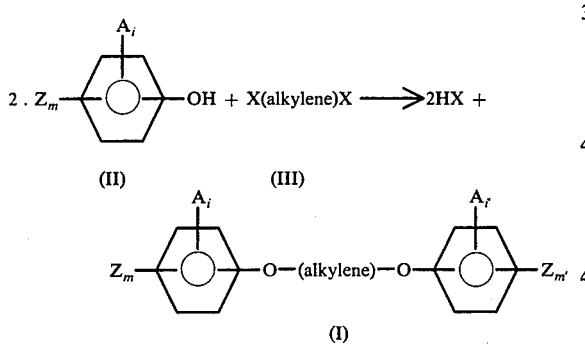

In the above reaction, X is halogen, preferably chlorine and alkylene is the same as herein defined. Where m and m' and i and i' are different integers, then equivalent molar portions of the particular halogenated phenol are used with equivalent portions of dissimilar halogenated phenol.

The above reaction is conducted at temperatures ranging from the freezing point of the initial reaction mass to the boiling point thereof. Preferably the temperatures are from about 40° C to about 200° C and more preferably from about 50° C to about 175° C. It is to be understood that the reaction can be conducted under sub-atmospheric (e.g. 1/10 - 8/10 atmospheres), atmospheric or super-atmospheric (e.g. 1.5 - 10 atmospheres) pressure. Preferably, the reaction is carried out at atmospheric pressure.

The above-described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in the examples set forth herein.

The amount of bis-phenoxy compound employed in the present invention compositions is any quantity which will effectively render the polystyrene containing composition flame retardant. In general, the amount used is from about 1% to 25% by weight, based on the total weight of the composition. Preferably, the amount employed is from about 5% to about 20% by weight. It is to be understood that any amount can be used as long as it does not substantially adversely effect the chemical and/or physical and/or mechanical properties of the end polymer composition. The amount utilized, however, is such amount which achieves the objectives described herein.

It is to be understood that the term polystyrene as used herein means polymers containing more than 60% styrene (phenylethylene, vinyl benzene, styrol, cinnamene) $C_6H_5CH=CH_2$ or other unsaturated aromatic monomers comprised of variously substituted styrene derivatives. This term also includes rubber modified impact-resistant polystyrene and styrene-acrylonitrile copolymers (sometimes referred to in the trade as SA or SAN).

Thus the polystyrenes used in the present invention compositions is any polystyrene herein defined and which one so desires to flame retard. It is to be understood that the polystyrenes used can be a "virgin" material, i.e. substantially free of additives such as stabilizers, plasticizers, dyes, pigments, fillers, and the like, or the polystyrenes can have additives (such as those mentioned and described herein) already contained therein or added concurrently with or after the addition of the bis-phenoxy compounds and enhancing agents.

Another facet of the present invention relates to the use of certain compounds which when used with the bis-phenoxy compounds promote a cooperative effect therebetween and thus enhance the flame retardancy of the resultant polymer composition as compared to the flame retardancy of either one component used separately. These "enhancing agents" comprise the oxides and halides of groups IVA and VA of the Periodic Table, i.e. oxides and halides of antimony, bismuth, arsenic, tin, lead, germanium, e.g. antimony oxychloride, antimony chloride, antimony oxide, stannic oxide, stannic chloride, arsenous oxide, arsenous chloride, and the like; and organic and inorganic compounds of phosphorus, nitrogen, boron, and sulfur, e.g., triphenyl phosphate, ammonium phosphate, zinc borate, thiourea, urea, stannic sulfide, and the like and oxides and halides of titanium, vanadium, chromium, manganese, iron, niobium, molybdenum, copper, zinc, magnesium, e.g., titanium dioxide, titanium chloride, vandanium pentoxide, chromic bromide, manganous oxide, molybdenum trioxide, ammonium molybdate; and hydrates of the above, e.g., stannic oxide hydrate, lead hydrate; and combinations thereof. The preferred enhancing agents are the oxides of antimony, arsenic and bismuth. However, any compound which on decomposition, as by ignition, yields these oxides would be suitable. Thus some organic antimonates are preferred. The enhancing agents disclosed in U.S. Pat. No. 3,205,196 are also suitable for use.

U.S. Pat. No. 3,205,196, column 2, states that "Antimony oxide is the antimony compound that is presently preferred for use in the present invention. However, many antimony compounds are suitable, inorganic antimony compounds include antimony sulfide sodium antimonite, potassium antimonite, and the like. Many organic antimony compounds are suitable such as the antimony salts of organic acids and their pentavalent derivatives disclosed in U.S. Pat. No. 2,996,528. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise the esters of antimonous acids and their pentavalent derivatives disclosed in U.S. Pat. No. 2,993,924, such as tris(n-octyl) and antimonite, tris(2-ethylhexyl) antimonite, tribenzyl antimonite, tris($\beta$-chloroethyl) antimonite, tris($\beta$-chloropropyl) antimonite, tris($\beta$-chlorobutyl) antimonite and their pentavalent compounds are the cyclic antimonites such as trimethylolpropane antimonite, pentaerythritol and antimonite, and glycerol antimonite. The corresponding arsenic and bismuth compounds can also be employed."

It is to be understood that such patents as U.S. Pat. Nos. 3,205,196; 2,996,528 and 2,993,924 are to be considered as incorporated herein by reference for all intents and purposes. Without limitation, preferred enhancing agents include $Sb_2O_3$, $SbCl_3$, $SbBr_3$, $SbI_3$, $SbOCl$, $As_2O_3$, $As_2O_5$, $ZnBO_4$, $BaB_2O_4.H_2O, 2.ZnO.3B_2O_3.3.5H_2O$ and stannic oxide hydrate. The more preferred enhancing agent is antimony trioxide.

The amount of enhancing agent employed in the present invention compositions is any amount which when used with said bis-phenoxy compounds will promote a cooperative effect therebetween. In general, the amount employed is from about 0.5% to about 15%, preferably from about 0.5% to about 10%, by weight, based on the total weight of plastic composition. Higher or lower amounts can be used as long as the desired end result is achieved.

It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pages 456 – 458, Modern Plastics Encyclopedia, ibid, (in addition to the new class of flame retardants described herein); heat stabilizers; light stabilizers; pigments; plasticizers; preservatives; ultraviolet stabilizers and fillers.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers — e.g. reclaimed rubber — and elastomerplastic blends); silica products (diatomaceous earth, novaculite, quartz, sand, tripoli, fumed colloidal silica, silica aerogel, wet process silica); silicates (asbestos, kaolimite, mica, nepheline syenite, talc, woolastonite, aluminum silicate and calcium silicate); and inorganic compounds such as barium ferrite, barium sulfate, molybdenum disulfide and silicon carbide.

The above mentioned materials, including fillers, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a plastic. In general, such amount will be from about 0% to about 75% and specifically from about 1% to about 50%.

The bis-phenoxy compounds can be incorporated into the polystyrenes at any processing stage in order to prepare the present invention compositions. In general, this is undertaken prior to fabrication either by physical blending or during the process of forming polystyrenes per se. Where one so desires, the bis-phenoxy compounds and/or enhancing agents may be micronized into finely divided particles prior to incorporation into the polystyrenes.

EXAMPLE I

A polystyrene plastic material, (Union Carbide TMDE 6500, a high impact polystyrene product free of additives) is utilized as the base resin in order to prepare 26 formulations (plastic compositions). With the exception of formulation No. 1, the particular bis-phenoxy compound (and the antimony trioxide enhancing agent where indicated) is incorporated into the plastic by adding both to a Brabender mixer ("Plastic-Corder", Torque Rheometer, Model PLV-150, C. W. Brabender Instruments Inc., South Hackensack, N.J.). The mixer is equipped with a pair of roller type blades positioned within a head provided with heat transfer means.

The resultant mixture is heated to about 245° C.; at this temperature, it is in a molten state. The percentages by weight of each component utilized in the respective formulations are listed in Table II. Each formulation is discharged from the mixer and upon cooling solidifies and is ground into chips. The chips are subjected to compression molding in a Wabash press by placing said chips between two platens, the bottom of which contains four equal size depressions three inches by five inches by $\frac{1}{8}$ inch deep. The top platen is then placed over the bottom platen and heat transfer means supplied thereto in order to melt said chips and thus provide solid samples (after cooling) for testing.

Portions of the solid samples of each respective formulation (Nos. 1 – 26) prepared according to the above described procedure are then subjected to two different standard flammability tests, i.e. UL 94 and ASTM D-2863-70. The UL 94 is, in general, the application of a burner to a test specimen (strip) for a certain period of time and observation of combustion, burning, and extinguishment. This procedure is fully set forth in Underwriters' Laboratories bulletin entitled UL 94, Standard for Safety, First Edition, September 1972 and which is incorporated herein by reference. ASTM No. D-2863-70 is a flammability test which correlates the flammability of a plastic specimen to the available oxygen in its immediate environment; this correlation is stated as an Oxygen Index, O.I., level predicated upon the percent oxygen in the gaseous medium which is required to just provide a steady state of continuous burning of the plastic specimen. This ASTM method is fully described in 1971 Annual Book of ASTM STandards — Part 27, published by the American Society For Testing and Materials, 1916 Race Street, Philadelphia, Pa.; this publication is to be considered as incorporated (in toto) herein by reference.

The results of these flammability tests are shown in Table II.

ASTM tests in order to ascertain other properties of the resultant plastic composition:

(1) Tensile Strength (at break)     ASTM Test No. D638-61T;

TABLE II

FLAMMABILITY DATA FOR POLYSTYRENE PLASTIC COMPOSITIONS CONTAINING BIS-PHENOXY COMPOUNDS

| FORMULATION NO. | BIS-PHENOXY NO. | COMPOUND % | ENHANCING AGENT $Sb_2O_3$, % | OXYGEN INDEX % | UL 94 |
|---|---|---|---|---|---|
| 1. | — | 0 | 0 | 18.0 | Burns |
| 2. | 5 | 20 | 0 | 21.5 | SB |
| 3. | 5 | 20 | 10 | 29.5 | SE-2 |
| 4. | 7 | 20 | 0 | 24.0 | SB |
| 5. | 7 | 20 | 10 | 33.0 | SE-O |
| 6. | 9 | 20 | 0 | 20.0 | SB |
| 7. | 9 | 20 | 10 | 27.5 | SE-2 |
| 8. | 10 | 20 | 0 | 22.5 | SB |
| 9. | 10 | 20 | 10 | 30.0 | SE-O |
| 10. | 14 | 20 | 0 | 23.5 | SB |
| 11. | 14 | 20 | 10 | 30.5 | SE-1 |
| 12. | 15 | 20 | 0 | 24.0 | SB |
| 13. | 15 | 20 | 10 | 30.0 | SE-1 |
| 14. | 17 | 20 | 0 | 24.0 | SB |
| 15. | 17 | 20 | 10 | 32.5 | SE-O |
| 16. | 18 | 20 | 0 | 24.5 | SB |
| 17. | 18 | 20 | 10 | 35.0 | SE-0 |
| 18. | 19 | 20 | 0 | 22.0 | SB |
| 19. | 19 | 20 | 10 | 28.5 | SB-2 |
| 20. | 21 | 20 | 0 | 23.0 | SB |
| 21. | 21 | 20 | 10 | 31.0 | SE-1 |
| 22. | 23 | 20 | 0 | 24.5 | SB |
| 23. | 23 | 20 | 0 | 33.5 | SE-0 |
| 24. | 1 | 20 | 0 | 21.0 | SB |
| 25. | 1 | 20 | 10 | 27.0 | SE-2 |
| 26. | 3 | 20 | 10 | 27.5 | SE-2 |

Referring to Table II, the bis-phenoxy compound number relates to the structural formulae heretofor set forth in Table I; a difference of 2% in the Oxygen Index values is considered significant; and the UL 94 values are on a graduated scale wherein the highest degree to lowest degree of flame retardancy is respectively SE-0, SE-1, SE-2, SB and Burns (or more recently classified as of February 1, 1974 as V-0, V-1, V-2, HB and Burns)

The results shown in Table II demonstrate the unique effectiveness of these bis-phenoxy compounds as flame retardants for polystyrene. Specifically, formulation No. 1 (the control) had a O.I. of 18.0 and UL 94 value of Burns. In Nos. 2, 4, 6, 8, 10, 12, 14, 16, 18, 20, 22 and 24, the use of the particular bis-phenoxy compound results in a significant increase (2-6.5%) in fire retardancy as measured by O.I. (While these formulations had a SB rating, UL 94, the individual U.L. rating has a wide range of values and thus the O.I. number is, in this case, more indicative of increased flame retardancy).

The use of an enhancing agent such as $Sb_2O_3$ to promote a cooperative effect between such agent and the bis-phenoxy compound is fully demonstrated via the results obtained from testing formulation Nos. 3, 5, 7, 9, 11, 13, 15, 17, 19, 21, 23, 25 and 26. The highest UL 94 ratings and significantly higher O.I. values (9.0–17.0% increase) are obtained.

EXAMPLE II

Example I is repeated twice; once using a 10% bis-phenoxy compound level and 3% and $Sb_2O_3$ level and secondly, 15% and 5% levels respectively. At both levels, the O.I. values and UL 94 ratings are slightly lower than 20%/10% level of Example I.

EXAMPLE III

Portions of the solid samples of formulation Nos. 1 – 26 prepared according to the above described procedure of Example I are subjected to the following (2) Flexural Strength    ASTM Test No. D790-63;
(3) Flexural Modulus    ASTM Test No. D790-63;
(4) Notched Izod Impact    ASTM Test No. D256-56; and
(5) Heat Distortion Temperature (HDT)    ASTM Test No. D648-56.

Each of the aforementioned ASTM Tests are standard tests in the art and are utilized collectively in order to ascertain the efficacy of a polymeric system as an overall flame retarded composition for commercial application. All of these ASTM Tests are to be considered as incorporated herein by reference.

The results of these ASTM Tests show that the physical properties of the present invention compositions are basically the same (except O.I. and UL 94 values) as the plastic material without the flame retardant (i.e. formulation No. 1). Thus, there is no substantial adverse effect on the physical properties of the plastic material when the novel compounds are incorporated therein.

EXAMPLE IV

The procedure of Examples I, II and III are repeated except that the enhancing agent used is zinc borate instead of $Sb_2O_3$. Substantially the same results are obtained using zinc borate as those obtained using $Sb_2O_3$. The other metal containing compounds are found to be equally effective.

EXAMPLE V

A strip sample of Formulation No. 9 Table II, can be subjected to light stability tests via the use of a "WeatherOmeter", model 25/18 W. R., Atlas Electrical Devices Company, Chicago, Illinois. Utilizing an operating temperature of 145° F and a 50% relative humidity, such strip is subjected to 100 hours of "simulated daylight" via the use of a Xenon arc. It is anticipated that the results would show that after 100 hours, there is little, if any, significant discoloration in any strip tested and which demonstrates that the present invention compositions are highly resistant to deterioration by light. The Gardner colorimeter (ΔE values) which would be obtained represent the change in color of the molded material after exposure to the Xenon arc.

EXAMPLE VI

Sample of Formulation No. 9 Table II, can also be subjected to temperature (thermal) stability tests via the use of thermal gravimetric analysis (TGA). This test employed the use of a "Thermal Balance", model TGS-1, Perkin-Elmer Corporation, Norwalk, Connecticut and an electrical balance, Cahn 2580 model, Cahn Instrument Company, Paramount, California. It is anticipated that the results of these tests would show that the bis-phenoxy compound containing Formulation had more than adequate stability for melt processing and subsequent heat aging (i.e. high temperature applications) and thus demonstrating that the particular bis-phenoxy compound is quite compatible with the plastic material. The bis-phenoxy compound stability thus aids in providing sufficient flame retardancy at the plastic decomposition temperature. This test would also demonstrate that these compounds do not exhibit migration.

The anticipated results of Examples V and VI are an extrapolation of the results obtained (using a similar type bis-phenoxy compound-No. III wherein both phenyl rings contained bromine) from applicant's co-pending patent application Ser. No. 612,740, filed Sept. 12, 1975, which case relates to the use of the same polymer, polystyrene.

With reference to Table II and to the present invention polymer compositions described herein, one of the important features thereof is the unusually high flame retardancy thereof. The significance of flame retardancy of polymer compositions is well recognized in the art as heretofor mentioned. However, recent developments in conjunction with the use of flame retardant polymer compositions as judged by the Consumer Product Safety Commision, require a UL-94 value (hereinafter discussed of V-0 in order to produce a commercially acceptable article of manufacture. The Consumer Product Safety Commission is continuing to set mandatory standards in the field where the polymer compositions are utilized and since about 1970 have increased the criticality of the UL value of polymer compositions. In reacting to the Consumer Product Safety Commission's mandatory standards in this area, the producers of (polymer composition) articles of manufacture are now requiring that said articles have a V-0 value in order to meet new mandatory standards which are anticipated to be activated by federal legislature shortly. Thus, the significance of a plastic composition having a V-0 value is well recognized in the art; note MODERN PLASTICS, September, 1974, pages 74 – 77, December, 1974, page 20, and December, 1975, pages 42 – 44, 48 – 50 and 59, and which publications are to be considered as incorporated herein by reference.

In conjunction with the present invention polymer compositions described herein, an important feature thereof is the light stability thereof. The significance of light stability of plastic compositions is recognized in the art, e.g. the publication entitled "The Measurement Of Appearance" by Mr. Richard S. Hunter (Hunter Associates Laboratory, Inc., 9529 Lee Highway, Fairfax, Virginia) 1973. Mr. Hunter has been associated with the efforts of defining appearance and color since the 1930's and was for many years an associate of Gardner who is another authority in this field. The following paragraphs from Mr. Hunter's book are set forth in order to demonstrate this light stability significance.

The Judd-Hunter system "of scales for color difference was based on Judd's uniform chromaticity scales triangle. Judd made an instrumental study of a number of woolen swatches rated by dyers for their acceptability as commercial color matches to standard. The NBS unit of color difference was designed by Judd to be the maximum difference commercially acceptable in the textile trade as represented by these dyers at the time when the study was carried out (Judd, 1939). The NBS Unit generally referred to today is not Judd's 1939 unit, but the Hunter 1942 version of the Judd unit with 100 units falling between black and white."

"Since 1942 this unit has been used in terms of a number of the opponent color scales. In a color scale which is already uniform in its visual spacing of lightness and chromaticity, and which has 100 units between black and white as well as rectangular coordinates for chromaticity, color difference in approximate NBS units can be specified in units of that system. The color difference becomes the distance between the two colors in that color space. With rectangular coordinates, the formula is:

$$\Delta E = \sqrt{\Delta L^2 + \Delta a^2 + \Delta b^2}$$

Similarly if only the chromaticity component of difference is desired, the formula is:

$$\Delta C = \sqrt{\Delta a^2 + \Delta b^2}$$

"Following Judd's proposed unit of color difference, Hunter proposed the measurement of much the same quantity by a photoelectric tristimulus method in 1942. In the next year, Scofield proposed a quantity which was quite a bit easier to compute. Scofield used the reciprocal of the square root of reflectance instead of the reciprocal of the fourth root of reflectance as a multiplier in adjusting reflectance values for uniform lightness scale intervals. This is the only difference between the Scofield and the Judd-Hunter formulas for color difference. (Scofield, 1943)."

"In 1948, Hunter started to develop a tristimulus instrument which would read chromaticity dimensions of opponent colors directly. He was seeking to improve the precision and usefulness of results of the tristimulus reflectometers previously used. The $R_d$ scales developed in the period 1948 and 1950 did not have a uniform lightness readout but did have direct reading visually uniform $a$ and $b$ scales. The L scales, in which there is approximate perceptual uniformity in all three dimensions, were created in the period 1950–1952 but were not described in a formal publication until 1958. These two sets of Hunter Color Difference Meter scales enjoy wide use because of the fact that they can be read directly from a tristimulus instrument with high precision, and offer instrumental computation of color difference by the ΔE formula given above."

"NBS Unit of Color Difference is defined as: the unit of color difference of the National Bureau of Standards. The unit is about four times as great as the smallest difference observable under ideal conditions. Differences of less than one unit are usually not important in commercial transactions. In Munsell terms, one NBS unit is equivalent to about 0.1 Value step, 0.15 Chroma step, or 2.5 Hue step at Chroma 1."

"Hunter further investigated the use of L', α', β' for color difference measurement. He recognized at this time (which no other color-difference scale before or since has recognized) that perceived color difference will depend on the proximity of the specimens compared and on their glossiness. Accordingly, the 1942 Hunter color difference equation includes factors to account for these variables. It is this equation, with selected constants, that defines the widely used NBS unit of color difference."

"High precision is almost always essential for useful color difference measurements. Only with precise instruments is it possible to measure color differences as small as those the eye can see. Instrument accuracy is also normally a requisite because spectrally inaccurate instruments, even though precise, will give visually inaccurate color difference measurements wherever there are spectral differences between the specimens involved. The ease of obtaining and interpreting values of color difference is another factor which may affect the selection of a procedure."

"Twenty years ago, color difference scales were in demand to serve as a basis for setting one-number tolerances for fading and acceptability of matches. The Index of Fading and NBS unit were used as units."

"Today, the concept of color difference is more refined. One number tolerances are seldom used. Instead, color difference tolerances are designed as boundaries in color space within which acceptable colors must fall. The boundaries do not necessarily correlate with perceptibility of difference but rather with the limits of acceptability. The standard color, furthermore, may not be in the center of the bounded region but may be displaced to one side. For example, where subsequent yellowing may occur, the tolerance for the yellow-blue dimension might be +0.1, −0.8 units."

"Color difference specifications are tighter today and tolerances are smaller. The specification usually treats the color dimensions separately so that a complete specification would contain nine numbers: The three numbers that describe the desired color, and the six numbers that describe the individual plus and minus tolerances. Such tolerances can be reduced to graphs which not only show acceptability but provide a guide to the formulation correction needed to correct an off shade. When the question of acceptability becomes a question of sorting objects according to shade, a graphical chart showing the classification of color values can be quite helpful."

"Although color measurements are frequently used for identification, sorting and recording of color values, the primary uses of tristimulus instruments all involve measurements of fairly small color differences. The most frequent uses of these small color difference measurements are to establish closeness to standard and to give guidance for the adjustment of color mismatches. They are also used in the study of deterioration in a product as a result of exposure and use."

"Spectrophotometers and tristimulus instruments made up the majority of color appearance measuring instruments in use in industry. Spectrophotometers give wavelength-by-wavelength analyses of the reflecting properties of objects, while tristimulus instruments by the use of filters which approximate the Standard Observer functions of the eye, give measurements of color in X, Y, Z terms, or in L, a, b values. Spectrophotometers are essential where color formulation is involved, and metamerism must be controlled. However, tristimulus colorimeters and reflectometers provide precise and less expensive means for the routine measurement of color and adjustment of small color differences."

In view of the foregoing quoted subject matter, it can thus be seen that a change in $\Delta E$ value of 1 unit constitutes a real change. Note also Japanese patent application (publication 022,456 of 1974) which shows that achieving a color change in $\Delta E$ of only 2.3 is significant as it pertains to a polycarbonate polymeric composition. Both of these publications (i.e. the Japanese Pat. No. 022,456 and the Hunter book) are to be considered as incorporated herein by reference. It is to be noted also that a lower $\Delta E$ value is more desired and the higher $\Delta E$ value is least desired. This $\Delta E$ value is not an abstract value, however, since one must compare it with the $\Delta E$ values of the "control" polymer composition. One of the desired $\Delta E$ values would be where both the $\Delta E$ values of the "control" polymer composition (without additives-i.e. without flame retardant and enhancing agent) and the polymer composition with said additives are substantially the same or the latter has a lower value.

In view of the foregoing Examples and remarks, it is seen that the plastic compositions, which incorporate these compounds and enhancing agents, possess characteristics which have been unobtainable in the prior art. Thus, the use of these compounds (and enhancing agents) in the above described plastic material as flame retardants therefor is quite unique since it is not possible to predict the effectiveness and functionality of any particular material in any polymer system until it is actively undergone incorporation therein and the resultant plastic composition tested according to various ASTM Standards. Furthermore, it is necessary, in order to have commercial utility, that the resultant flame retarded plastic composition possess characteristics such as being non-toxic. Use of these compounds and enhancing agents in the plastic material has accomplished all of these objectives.

The above examples have been described in the foregoing specification for the purpose of illustration and not limitation. Many other modifications and ramifications will naturally suggest themselves to those skilled in the art based on this disclosure. These are intended to be comprehended as within the scope of the invention.

What is claimed is:

1. A plastic composition containg polystyrene having incorporated therein (1) an effective amount of a flame retardant which is a bis-phenoxy compound having the formula:

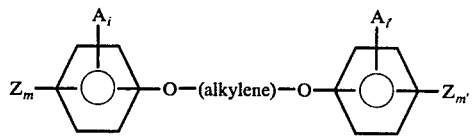

wherein Z is bromine; $m$ is an integer having a value of 1–5 and $m'$ is an integer having a value of 0–4; $i$ is an integer having a value of 0–2 and $i'$ is an integer having a value of 1–5; alkylene is a straight or branched chain alkylene group having from 1 to 6 carbon atoms; and A is chlorine; and (2) an enhancing agent which is antimony, arsenic, bismuth, tin or zinc-containing compound.

2. The composition as set forth in claim 1 wherein $i$ is 0 and $m'$ is 0.

3. The composition as set forth in claim 1 wherein $i$ and $i'$ are both 1.

4. The composition as set forth in claim 2 wherein alkylene is $CH_2$.

5. The composition as set forth in claim 2 wherein alkylene is $C_2H_4$.

6. The composition as set forth in claim 2 wherein alkylene is $C_3H_6$.

7. The composition as set forth in claim 2 wherein alkylene is $C_4H_8$.

8. The composition as set forth in claim 5 wherein $m$ and $m'$ are both 2 and $i$ and $i'$ are both 1.

9. The composition as set forth in claim 6 wherein $m$ and $m'$ are both 2 and $i$ and $i'$ are both 1.

10. The composition as set forth in claim 7 wherein $m$ and $m'$ are both 2 and $i$ and $i'$ are both 1.

11. The composition as set forth in claim 4 wherein $m$ is 3, $i$ is 0, $m'$ is 0 and $i'$ is 5.

12. The composition as set forth in claim 5 wherein $m$ is 3, $i$ is 0, $m'$ is 0 and $i'$ is 5.

13. The composition as set forth in claim 6 wherein $m$ is 3, $i$ is 0, $m'$ is 0 and $i'$ is 5.

14. The composition as set forth in claim 7 wherein $m$ is 3, $i$ is 0, $m'$ is 0 and $i'$ is 5.

15. The composition as set forth in claim 1 wherein said enhancing agent promotes a cooperative effect with said compound to increase the flame retardancy of said composition, and said agent is selected from the group consisting of $Sb_2O_3$, $SbCl_3$, $SbBr_3$, $SbI_3$, $SbOCl$, $As_2O_3$, $As_2O_5$, $ZnBO_4$, $BaB_2O_4 \cdot H_2O$, $2.ZnO.3B_2O_3.3.5H_2O$ and stannous oxide hydrate.

16. The composition as set forth in claim 1 wherein said enhancing agent which promotes a cooperative effect with said compounds to increase the flame retardancy of said composition in antimony trioxide.

* * * * *